(12) United States Patent
Koevoets et al.

(10) Patent No.: US 10,676,895 B2
(45) Date of Patent: Jun. 9, 2020

(54) ADJUSTABLE OVERFLOW SYSTEM

(71) Applicant: IHC Holland IE B.V., Sliedrecht (NL)

(72) Inventors: Adrianus Josephus Petrus Marie Koevoets, Klein Zundert (NL); Arjen van der Horst, Delft (NL)

(73) Assignee: IHC Holland IE B.V., Sliedrecht (NL)

( * ) Notice: Subject to any disclaimer, the term of this patent is extended or adjusted under 35 U.S.C. 154(b) by 445 days.

(21) Appl. No.: 15/506,259

(22) PCT Filed: Aug. 24, 2015

(86) PCT No.: PCT/NL2015/050589
§ 371 (c)(1),
(2) Date: Feb. 24, 2017

(87) PCT Pub. No.: WO2016/032328
PCT Pub. Date: Mar. 3, 2016

(65) Prior Publication Data
US 2017/0275849 A1 Sep. 28, 2017

(30) Foreign Application Priority Data

Aug. 26, 2014 (NL) ...................................... 2013368

(51) Int. Cl.
*E02F 7/06* (2006.01)
*B01D 21/24* (2006.01)
(Continued)

(52) U.S. Cl.
CPC .......... *E02F 7/065* (2013.01); *B01D 21/2427* (2013.01); *B01D 21/2444* (2013.01);
(Continued)

(58) Field of Classification Search
CPC .... E02F 7/00; E02F 7/04; E02F 7/065; B01D 21/24; B01D 21/2405; B01D 21/2411; B01D 21/2427
See application file for complete search history.

(56) References Cited

U.S. PATENT DOCUMENTS

| | | | |
|---|---|---|---|
| 3,630,400 A | * | 12/1971 | De Koning .............. B63B 27/24 406/38 |
| 3,999,566 A | | 12/1976 | Iwata et al. |

(Continued)

FOREIGN PATENT DOCUMENTS

| | | |
|---|---|---|
| DE | 2538001 A1 | 3/1977 |
| EP | 0000075 A1 | 12/1978 |

(Continued)

OTHER PUBLICATIONS

Search Report in CN application No. 2015800457221.

*Primary Examiner* — Matthew Troutman
(74) *Attorney, Agent, or Firm* — N.V. Nederlandsch Octrooibureau; Catherine A. Shultz; Katelyn J. Bernier (57) ABSTRACT

An overflow system for a hopper dredger comprises an overflow tube; an inlet for taking in head water from the hopper; and a collector to collect the flow of head water entering the inlet and guide the flow to the overflow tube. The collector comprises a substantially horizontal top portion which delineates a top of a flowpath for head water into the collector to ensure substantially radial flow into the collector. At least one of the overflow tube and the inlet is adjustable for controlling flow into the overflow system.

20 Claims, 5 Drawing Sheets (51) Int. Cl.
*E02F 7/04* (2006.01)
*E02F 3/88* (2006.01)
*B01D 21/34* (2006.01)
*B63B 13/02* (2006.01)
*E02F 3/92* (2006.01)
*B01D 17/00* (2006.01)

(52) U.S. Cl.
CPC .............. *B01D 21/34* (2013.01); *B63B 13/02* (2013.01); *E02F 3/885* (2013.01); *E02F 3/8841* (2013.01); *E02F 3/9212* (2013.01); *E02F 3/9243* (2013.01); *E02F 7/04* (2013.01); *B01D 17/00* (2013.01); *B01D 2221/08* (2013.01)

(56) References Cited

U.S. PATENT DOCUMENTS

| | | | | |
|---|---|---|---|---|
| 4,184,954 | A | * | 1/1980 | Peterson ............ B01D 21/0042 210/199 |
| 4,206,057 | A | | 6/1980 | Nieuwendijk |
| 4,245,932 | A | * | 1/1981 | van Zeggelaar ....... B65G 53/30 406/197 |
| 5,219,470 | A | * | 6/1993 | Bradley ............... B01D 21/245 210/520 |
| 5,340,485 | A | * | 8/1994 | Bradley ............... B01D 21/245 210/520 |
| 2015/0040813 | A1 | | 2/2015 | Kik et al. |

FOREIGN PATENT DOCUMENTS

| | | |
|---|---|---|
| NL | 9201853 A | 5/1993 |
| TW | 201114987 A | 5/2011 |
| WO | 2010/122093 A1 | 10/2010 |
| WO | 2013/115642 A1 | 8/2013 |
| WO | 2013/119107 A1 | 8/2013 |

\* cited by examiner

ADJUSTABLE OVERFLOW SYSTEM

BACKGROUND

Trailing suction hopper dredgers ("TSHD") are vessels which can be used to dredge at sea or in open water. TSHD's typically use a suction tube, one end of which can be lowered to the seabed and used to suck up solids such as sand, sludge, silt or sediment, mixed with water. The lower end of this suction tube can be provided with a suction head or a drag head. The solid material mixed with water is pumped through the suction tube into a hopper of the dredging vessel. The mixture is reduced in speed when in the dredger hopper, and this speed reduction allows for the settling of components suspended in the mixture. Excess water is then overflowed out of the hopper through an overflow to allow for more load capacity within the TSHD.

Water from the hopper flows into the overflow through an entry disk or directly into the overflow from the top. This overflow volume is then released via the bottom of the dredging vessel. Due to the generally vertical flow orientation of the overflow, the cross-sectional area of the overflow and the velocity, the overflow volume typically mixes with air. This mixture can reduce the specific weight of the mixture, causing the overflow mixture to stick to the ship's hull and the boundary flow of the underwater vessel. This mixture, which may also contain lighter particles which have not settled, and the interactions between the overflow volume released, the hull, propellers, speed of the vessel and currents; can form a plume in the wake of the dredging process. The settling of this mixture can then have an adverse effect on the local environment. The air in the flow also causes a resistance in the overflow, reducing the effective transport capacity of the overflow.

One method to combat this plume caused by suspended particles is disclosed in WO 2013/119107. A passive overflow device is used to drain away head water and flow it through a conduit to an outlet abutting the sea bottom to deliver the head water close to the sea bottom, thereby minimizing the influence on sea life. U.S. Pat. No. 3,975,842 discloses a system which also attempts to minimize the environmental effects by directing the overflow to the suction head to be used as the liquid supply for loosening the soil to be suctioned, thus forming a closed system where the overflow is recycled.

WO2010/122093 also shows an overflow system which uses an overflow pipe which is open at the top for receiving the overflow. The head water enters from the open top and then flows through the vertical pipe. The top of the pipe is adjustable in height to allow more or less flow into the overflow.

SUMMARY

According to a first aspect of the invention, an overflow system for a hopper dredger comprises an overflow tube; an inlet for taking in head water from the hopper; and a collector to collect the flow of head water entering the inlet and guide the flow to the overflow tube. The collector comprises a substantially horizontal top portion which delineates a top of the flowpath for head water into the collector to ensure substantially radial flow into the collector. At least one of the overflow tube and the inlet is adjustable for controlling flow into the overflow system.

This overflow system can provide for more control of flow into and through the system by having at least one of the overflow tube and the inlet be adjustable for controlling flow into the overflow system, and using the collector with a top portion to ensure substantially radial flow into the system. The adjustability of the overflow system and the flow path through collector and flow channel helps to reduce or eliminate the introduction of air into the flow of head water through the overflow system.

According to an embodiment, the overflow tube is adjustable in height.

According to an embodiment, the overflow system further comprises a sleeve connecting to the collector and extending inside the overflow tube. The sleeve, an inner side of the overflow tube and/or the collector form a flow channel through the overflow tube. The flow channel helps to further guide flow through the system, reducing the flow area and thereby reducing or eliminate the introduction of air into the flow, and subsequent turbidity.

According to an embodiment, the sleeve comprises a tubular shaped cylinder extending from the collector inside the overflow tube to form an annular flow channel between the inner side of the overflow tube and the sleeve.

According to an embodiment, the sleeve comprises a tube connected to the collector and extending inside of the overflow tube to form the flow channel through the tube. Optionally, the system can further comprise one or more additional tubes connected to the collector to form one or more additional flow channels through the tubes. Further optionally, the one or more tubes are flexible.

According to an embodiment, the overflow system further comprises a water level sensing device for sensing a level of head water in the hopper.

According to an embodiment, the inlet comprises a plurality of inlets. Optionally, the plurality of inlets are radial inlets.

According to an embodiment, the collector comprises a collector ring around the inner circumference of the overflow tube at the inlet.

According to an embodiment, the overflow system further comprises a slide for selectively controlling the size of the inlet. Optionally, the slide is controlled by a float.

According to an embodiment, the overflow system comprises a pressure sensor for sensing pressure near the inlet; an actuator system for controlling the slide; and a processing unit for receiving pressure sensor readings and controlling the actuator system based on the pressure sensed.

According to an embodiment, the processing unit controls the actuator system to adjust the slide so that the pressure at the pressure sensor remains at or above a set value. Optionally, the set value is higher than local atmospheric pressure.

According to an embodiment, the top portion of the collector comprises a lid selectively moveable up and down with respect to the overflow tube for adjusting the inlet to control flow into the overflow system.

According to an embodiment, the lid is at least as large as the larger of the overflow tube and the collector. Optionally, the lid can include a plurality of ribs for guiding flow into the overflow system.

According to an embodiment, the lid is controlled by a float.

According to an embodiment, the overflow system further comprises a control system for controlling the movement of lid. The control system comprises a pressure sensor for sensing pressure near the inlet; an actuator system for controlling the lid movement; and a processing unit for receiving pressure sensor readings and controlling the actuator system based on the pressure sensed.

According to an embodiment, a vessel comprises the overflow system. Optionally, the overflow tube and/or flow channel extends to a bottom of the vessel. Further optionally, the overflow tube and/or flow channel extends beyond a bottom of the vessel.

According to a second aspect of the invention, a method of flowing head water from a hopper to an exit of a vessel comprises adjusting an overflow system based on a pressure at an inlet of the overflow device; flowing the head water from the hopper through the inlet of the overflow system in a substantially radial direction by delineating a top of a flowpath into the collector with a substantially horizontal top portion of a collector; flowing the head water from the inlet to the collector within the overflow system; and flowing the head water from the collector to an overflow tube.

According to an embodiment, the step of flowing the head water from the collector to the overflow tube comprises flowing the head water from the collector to a flow channel within the overflow tube.

According to an embodiment, the step of adjusting the overflow system comprises adjusting a height of the overflow system.

According to an embodiment, the step of adjusting the overflow system comprises adjusting the size of the inlet of the overflow system.

According to an embodiment, the step of adjusting the overflow system comprises adjusting the inlet of the overflow system in relation to the level of head water in the hopper.

BRIEF DESCRIPTION OF THE DRAWINGS

FIG. 2b illustrates a close-up perspective view of the overflow system of FIG. 2a.

FIG. 3b illustrates a cross-sectional view of the overflow system of FIG. 3a.

FIG. 4b illustrates a cross-sectional view of the overflow system of FIG. 4a.

DETAILED DESCRIPTION

Figure 1:
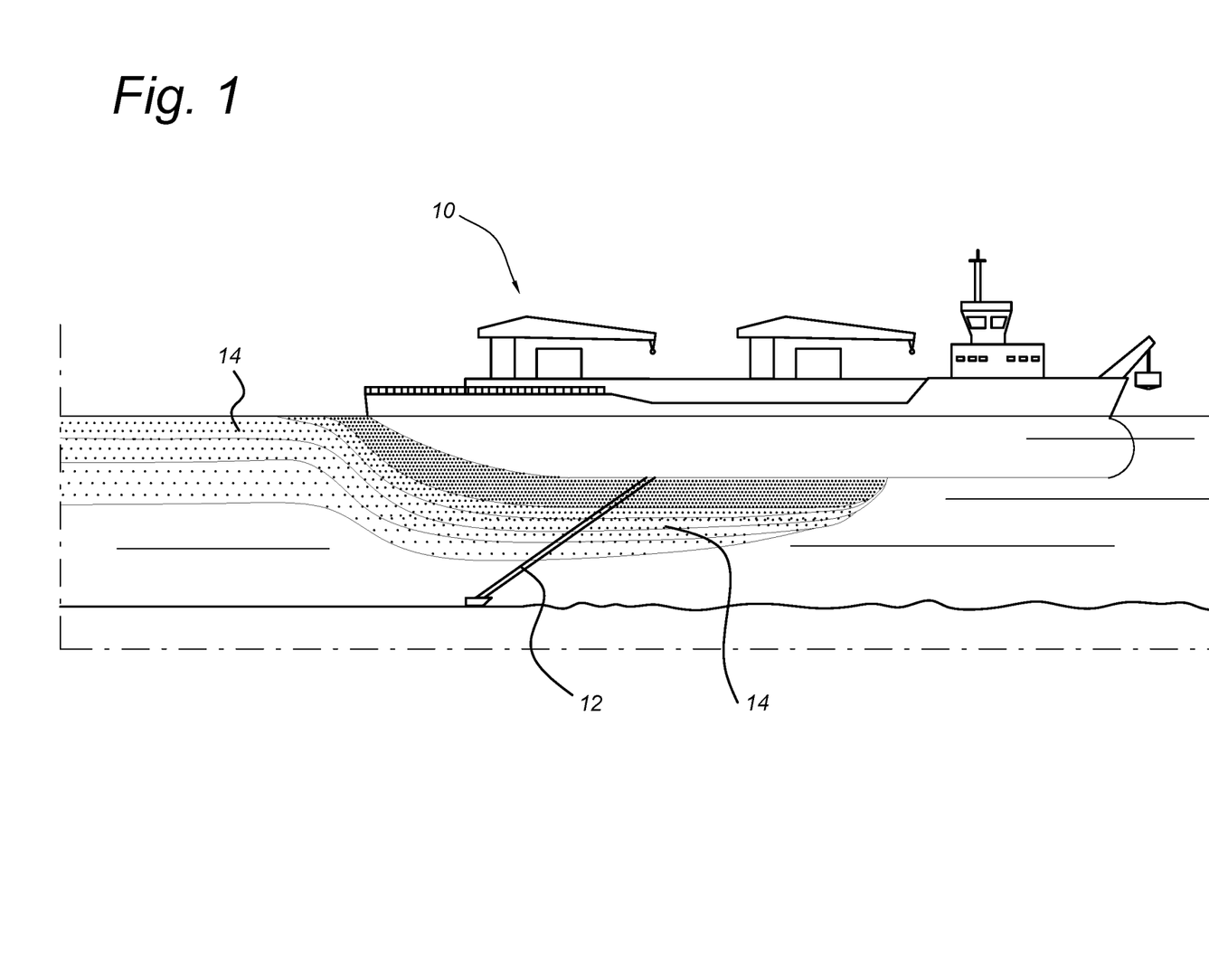
FIG. 1 illustrates a trailing suction hopper dredger during a dredging operation.

FIG. 1 illustrates a trailing suction hopper dredger ("TSHD") 10 during a dredging operation. Trailing suction hopper dredger 10 is suctioning a mixture of water and solid particles through suction tube 12. This mixture is then transported to a hopper in THSD 10 (not shown). Excess liquid in the hopper is overflowed, and plume 14 forms due to mixing of air with the overflow, the vertical orientation of the overflow, and the speed and the general flow causing the overflow water to mix with air.

Plume 14 can have an adverse impact on local marine biotope, as it reduces the entrance of light into the water body. Additionally, in some cases, the settling particles smother bottom life, and the suspensions can reduce the ability for microorganisms to develop. The bubbles in the flow also cause a resistance in the overflow, reducing the effective transport capacity of the overflow. Forming an overflow which is adjustable to control the flow of head water into and through the overflow can help to reduce turbidity and the mixing of air into the head water, thus reducing or eliminating the plume 14 exiting vessel 10.

Figure 2A:
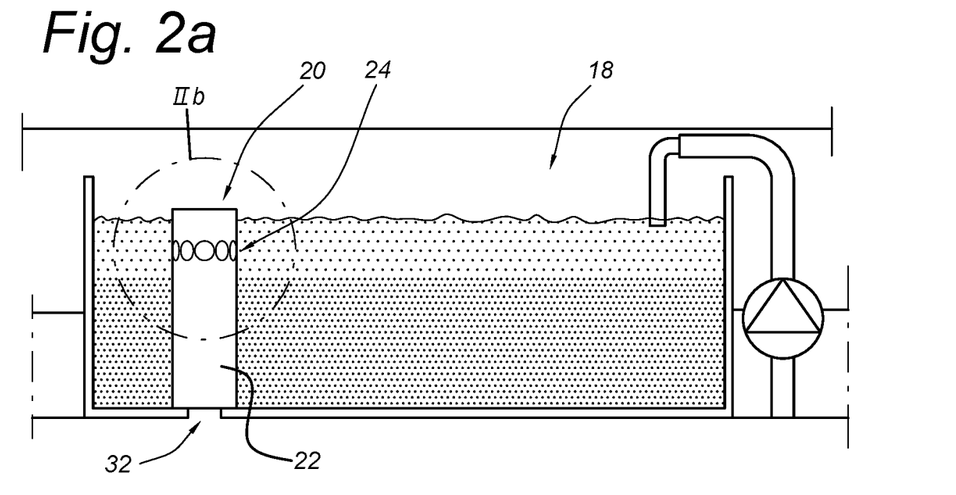
FIG. 2a illustrates a view of a dredger hopper and an overflow system.
Figure 2B:
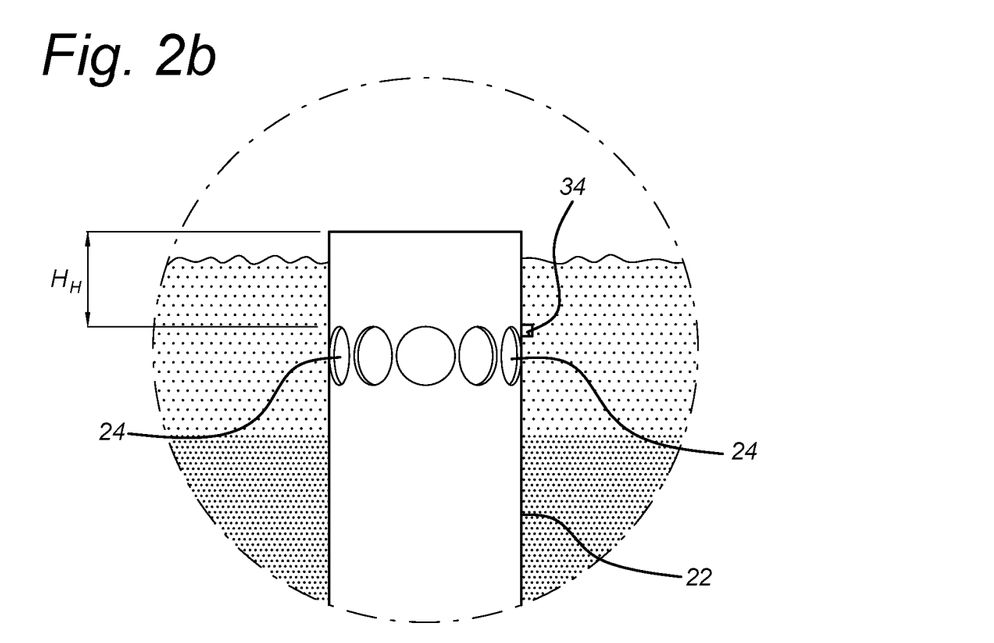
Figure 2C:
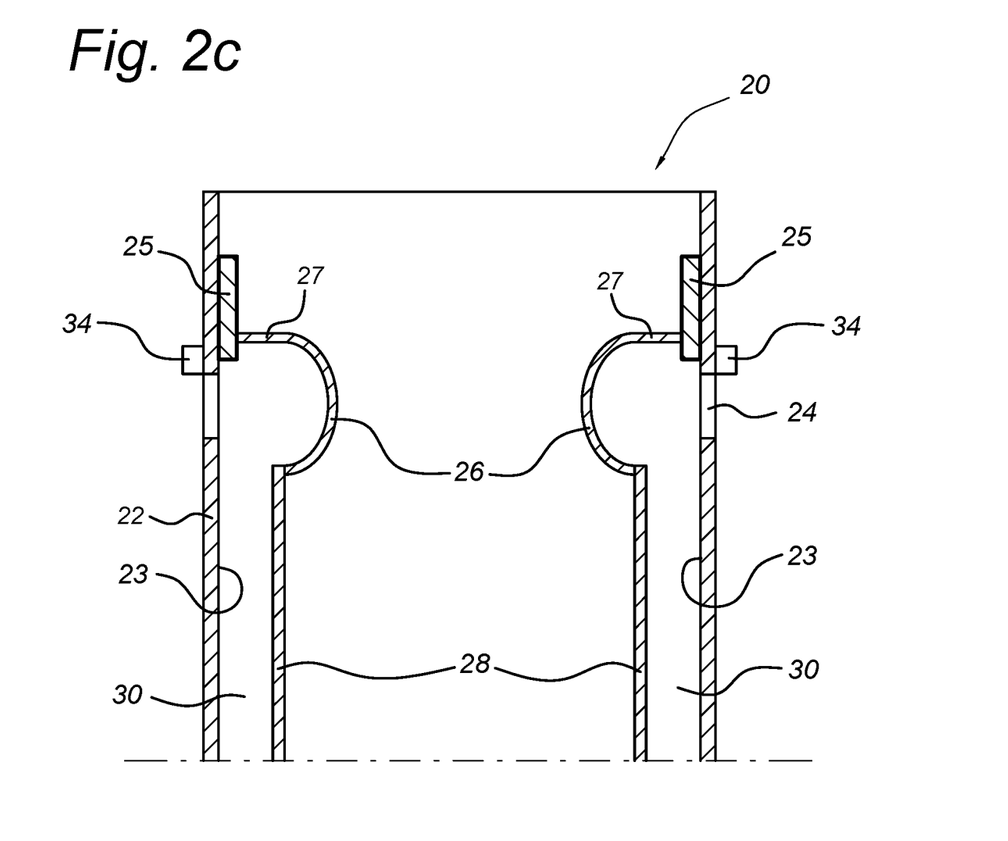
FIG. 2c illustrates a cross-sectional view of the overflow system of FIG. 2b.

FIG. 2a illustrates a perspective view of a dredger hopper 18 or a loading space within a TSHD, and overflow system 20 which can transport head water from the hopper 18 back into a liquid body. FIG. 2b illustrates a close-up perspective view of overflow system 20, and FIG. 2c illustrates a cross-sectional view of overflow system 20. Overflow system 20 includes overflow tube 22 with inner side 23, inlets 24, slide 25, collector 26 (with top portion 27), sleeve 28, flow channel 30, fluid outlet 32 and pressure sensor 34.

Overflow tube 22 can be adjustable in height so that inlets 24 are moved in relation to the water level and/or pressure in hopper 18. This can be done using a manual height control system or other systems. This movement can be set in combination with pressure sensor 34, a water level sensor in hopper 18 and/or other sensors or devices to determine water level and/or pressure of water in hopper 18, and subsequently the desired adjustment of overflow tube 22 in relation to any measurements. Overflow tube 22 can also allow for the entrance of liquids through the top in the case of emergency, to ensure that excess water from the hopper 18 can be removed rapidly.

Inlets 24 are shown as a plurality of circular or oval shaped radial holes in overflow tube 22. In other embodiments, inlets 24 can be other shapes and/or more or fewer inlets could be present in the system. Inlets 24 are placed at a distance $H_H$ from top of overflow tube 22, with distance $H_H$ being a distance for avoiding the formation of vortexes at each inlet 24. The distance can be determined by the maximum fluid level in hopper 18. Pressure sensor 34 can be located directly in front of inlets 24 so that pressure of head water entering inlets 24 can be accurately measured.

Slide 25 can be selectively moved to make inlets 24 larger or smaller for allowing more or less water into overflow system 20. While slide 25 is shown on the inside of overflow tube 22, slide 25 could be located elsewhere, for example on an outside of overflow tube 22. Slide 25 can be moved by a passive flow adjuster system controlled by an external floating device (see FIG. 3a), an active pressure guided hydraulic electric system or another type of system. For example, the control of slide 25 can involve an actuator system, one or more sensors and/or a processing unit. Pressure sensor 34 could send a pressure sensor reading to the processing unit. The processing unit could determine that the pressure reading was such that inlets 24 should be allowed more flow area. Thus, actuator system could move slide 25 to open inlets 24, allowing more flow into overflow system 20. The processing unit could control the actuator system to ensure that the pressure remains at or above a set value, for example, higher than local atmospheric pressure.

Collector 26 is a collector ring that extends inward from inlets 24 to collect the mixture that enters inlets 24. Top portion 27 is substantially horizontal and delineates a top portion of the flowpath to ensure that flow through inlets 24 into overflow system 20 is in a substantially radial direction. Collector 26 can also work to control the velocity of the mixture entering overflow system 20, and to guide the mixture into flow channel 30.

Sleeve 28 is a cylinder which extends inside overflow tube 22 from collector 26. Flow channel 30 is an annular flow channel between inner side 23 of overflow tube 22 and sleeve 28. Flow channel 30 extends from collector 26 to fluid outlet 32. Flow channel 30 cross-sectional area is set to decrease the flow area through overflow tube 22 based on factors for controlling the flow through and out of overflow system 20. The total mass flow through the system is defined by the performance of a dredging pump used and the efficiency of the settling process. The maximum velocity through overflow system 20 is determined by the maximum height between the level of water in hopper 18 and the water level outside vessel 10, and a factor for the inlet 24 entrance resistance and collector 26 shape. The cross-sectional area of flow channel 30 must be at least equal to (and not less than) the total mass flow through the system divided by the maximum velocity through the system to ensure that mixture can flow freely into overflow system 20 and can reach its maximum velocity when flowing through and out of overflow system 20.

Outlet 32 could be at a bottom of vessel 10, at a point below vessel 10 or at another point. Outlet 32 must be below a minimum fluid level in the overflow system 20 so as to avoid additional introduction of air bubbles into the overflow mixture.

In operation, as discussed above, TSHD suctions a mixture of liquid and fractions, and deposits that mixture into dredger hopper 18. The head water in dredger hopper 18 continues to rise as particles and fractions settle. When the head water reaches the level of inlets 24, the head water enters overflow system 20 through inlets 24 in a substantially radial flow. Overflow system 20 works to control the velocity and flow of head water into and through overflow system 20 to reduce or eliminate air in the mixture, and thereby reduce or eliminate any plume exiting the vessel as a result of this air. This is done through adjusting overflow system 20 based on the pressure and/or water level in the hopper 18 to control the mixture entering into overflow system 20 through inlets 24; and using collector 26 with top portion 27 and flow channel 30 to control the flow and velocity through and out of overflow system 20.

The adjustment of overflow system 20 can be through adjusting the height of overflow tube 22 and/or adjusting the area of inlets 24 (with slide 25). The adjustment of height of overflow tube 22 can be in relation to a pressure sensor 34 and/or another sensor to determine water level within hopper 18, and to keep inlets 24 above settled particles in hopper 18 and at a level to avoid the formation of vortexes at each inlet 24. Additionally, overflow tube 22 can be adjusted so that inlets 24 are located at a position to receive head water at a desired pressure level within hopper 18, thereby controlling the rate at which head water enters overflow system 20. This is dependent on the level of water within the hopper 18 as well as the characteristics of the mixture and flow within hopper 18. Adjusting the flow through inlets 24 can help to promote the desired settling of particles within hopper 18 by keeping the velocity entering overflow system 20 to a level which promotes settling of particles in hopper 18.

Additionally or alternatively, slide 25 can move to change the area of inlets 24, increasing or decreasing the area which receives a flow of head water into overflow system 20. This can be used to control the velocity with which head water enters overflow system 20 (promoting the desired settling within hopper 18). Additionally, the adjustment of inlets 24 provides for better control of flow into and through overflow system 20. By adjusting the inlets 24, mass flow through system 20 can be controlled to decrease or eliminate the introduction of new air when the mixture is flowing through overflow system, and to maximize the capacity of overflow system 20.

Collector 26 and flow channel 30 (formed by sleeve 28 and inner side 23 of overflow tube 22) reduce the flow area for mixture through overflow system 20, ensuring that additional air does not flow into mixture when flowing through overflow system 20. The reduction of the flow area through overflow tube 22 can be done in a number of ways using sleeve 28, collector 26 and/or interior side 23 of overflow tube 22 to form flow channel 30 which has a smaller cross-sectional diameter than that of overflow tube 22. The area of collector 26 and flow channel 30 can be set to allow for flow of mixture at a velocity high enough to allow the mixture to clear the boundary layer of vessel 10 when exiting, thereby helping to reduce or eliminate any plume formed by turbidity. As the flow channel 30 cross-sectional area is set so that flow channel 30 stays full of mixture and that the maximum flow velocity can be reached, this increases the overall capacity of overflow system 20.

By using adjustable inlets 24, collector 26 and sleeve 28; and collector 26 and/or interior side 23 of overflow tube 22 to form flow channel 30 with a reduced cross-sectional area (as compared to overflow tube 22), overflow system 20 can control the velocity and flow into and through overflow system 20. This control can ensure that proper settling is taking place within hopper 18, and that mixture can flow into and through overflow system at a desired velocity without the introduction of air to cause turbidity and/or a plume upon exit. Regulations require a set capacity for overflow system 20, and the introduction of a flow channel 30 within overflow tube 22 allows for the meeting of overall capacity prescribed in regulations while providing a system which can control flow into and through overflow system to reduce or eliminate turbidity.

Figure 3A:
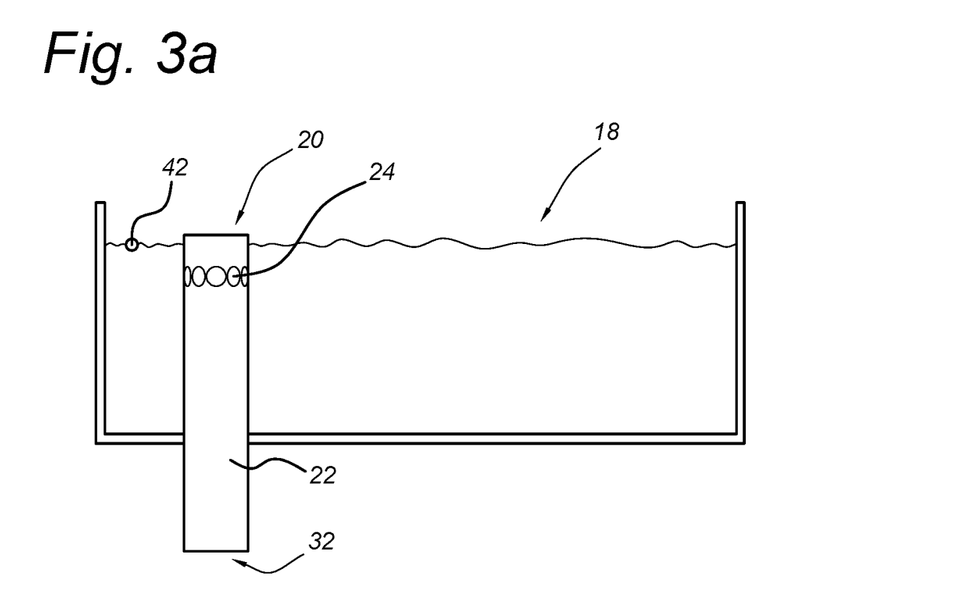
FIG. 3a illustrates a perspective view of a dredger hopper and a second embodiment of an overflow system.
Figure 3B:
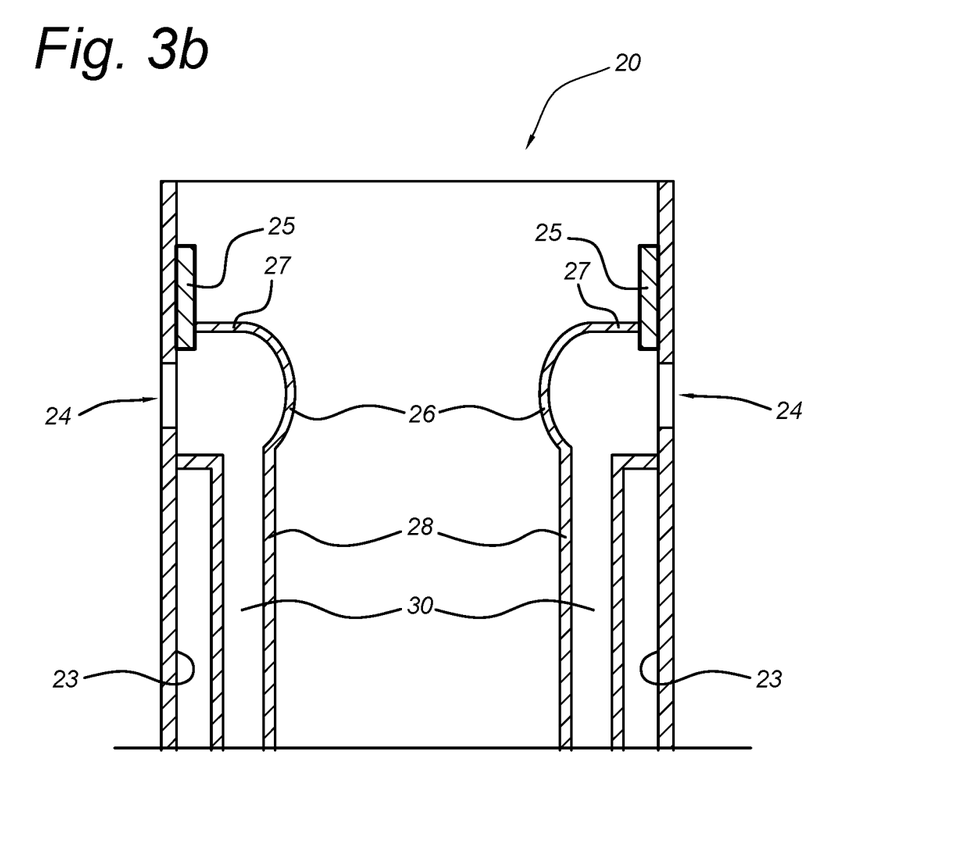

FIG. 3a illustrates a perspective view of a dredger hopper and a second embodiment of an overflow system 20, and FIG. 3b illustrates a cross-sectional view of the overflow system 20. Similar parts are labelled similarly to FIGS. 2a-2c. Overflow system 20 includes overflow tube 22 with inner side 23, inlets 24, slide 25, collector 26 with top portion 27, sleeves 28, flow channels 30, fluid outlet 32 and water level sensor 42. Collector 26 can be a collector ring as in FIGS. 2a-2c or could be a plurality of individual collectors, each connected to one or more inlets 24.

Water level sensor 42 can be a floating device, or could be electronic. Water level sensor 42 can be used to sense the level of water within hopper 18. The sensed measurements and/or water level sensor 42 can be used to control slide 25 and therefore the area of inlets 24. This can be done directly, for example, through a mechanical coupling, or through a hydraulic or electronic device.

In the embodiment of FIGS. 3a-3b, sleeves 28 are a plurality of tubes extending from one or more collectors 26 to form a plurality of flow channels 30. These sleeves 28 can be flexible or fixed, and extend to or near fluid outlet 32. Fluid outlet 32 is located beyond the bottom of vessel 10.

Overflow system 20 works much in the same way that overflow system 20 of FIGS. 2a-2c works, allowing for adjustment of overflow tube 22 and/or inlets 24 to control flow into and through overflow system 32. Sensor 42 can control slide 25 to decrease flow area into collector 26 by at least partially covering inlets 24 when desired, for example, when water level in hopper 18 is sensed as declining. Conversely, when sensor 42 determines water levels are rising, slide 25 can move to increase the area of inlets 24 to allow increased flow through overflow system 32. Flow into inlets 24 is collected by collector 26 and top portion 27 ensures this flow is in a substantially radial direction. Collector 26 then guides the flow into sleeves 28, where it flows toward outlet 32. Adjustable inlets 24, collector 26 and flow channel(s) 30 results in an overflow system which can better control the flow into and through overflow system to reduce or eliminate turbidity.

Figure 4A:
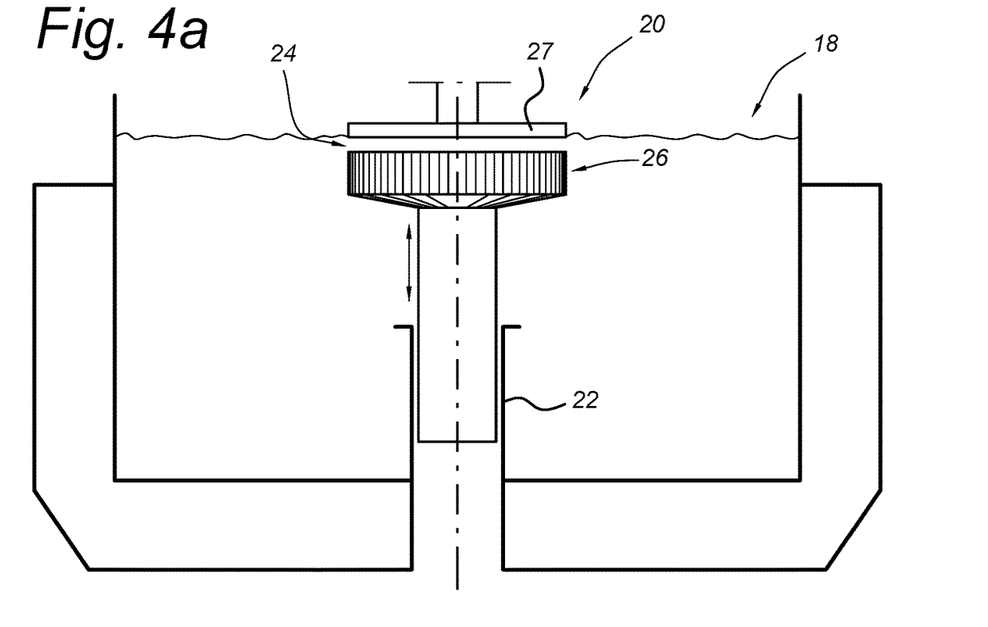
FIG. 4a illustrates a perspective view of a dredger hopper and a third embodiment of an overflow system.
Figure 4B:
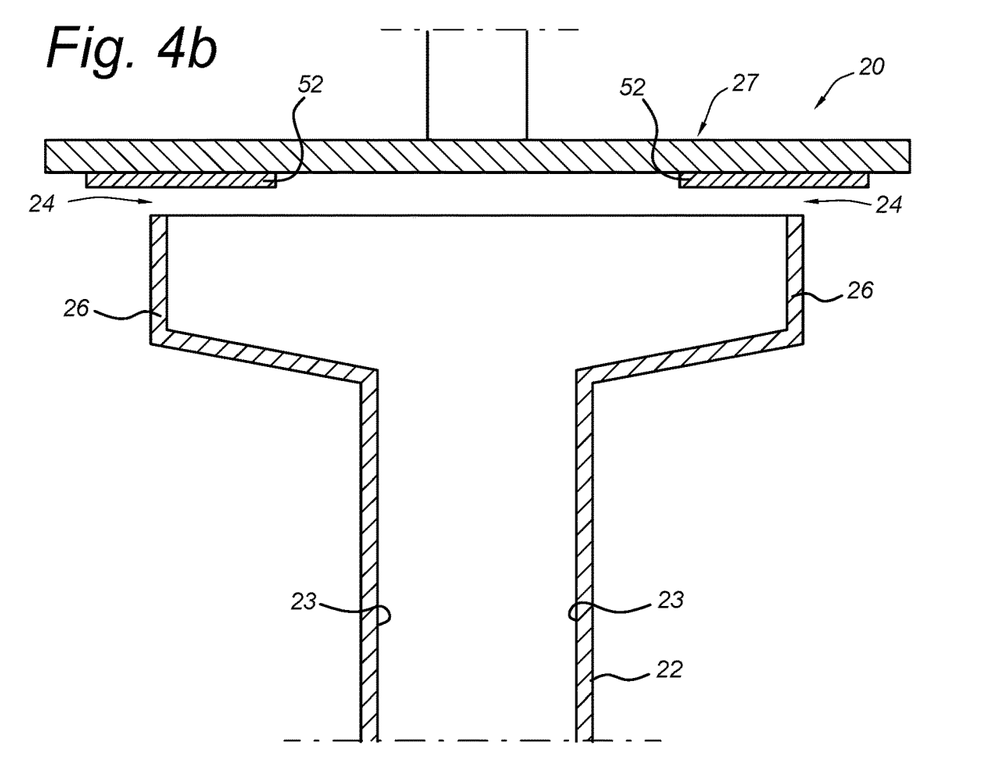

FIG. 4a shows a perspective view of overflow system 20, and FIG. 4b shows a cross-sectional view of overflow system 20. Overflow system 20 includes overflow tube 22 with inner side 23, inlet 24, collector 26 with top portion 27 and ribs 52.

Collector 26 is a tubular shaped, with a sloping bottom which flows head water toward flow channel 30. In this embodiment, top portion 27 of collector is connected to a part of hopper 18 (not shown) and is moveable in relation to collector 26 and overflow tube 22. In other embodiments, top portion 27 could be connected to a float or another part of overflow system 20.

Inlet 24 is an open space between collector 26 and top portion 27, and the flow into collector 26 is delineated at the top by substantially horizontal top portion 27 and can be further controlled by controlling the space between top portion 27 and collector 26. Top portion 27 is sized larger than collector 26 and can include ribs 52 to further guide flow into overflow system 20 in a substantially radial direction.

Top portion 27 is adjustable to increase or decrease the size of inlet 24 based on the flow desired. This adjustment can be with, for example, a hydraulic system, and the adjustment can be based on various sensors detecting pressure, liquid level and/or flow around inlet 24 and/or elsewhere in hopper 18.

In summary, by making an overflow system 20 adjustable at an inlet and introducing collector 26 with a substantially horizontal top portion 27, flow can be guided into overflow system 20 in a substantially radial direction resulting in less turbidity of flow through overflow system 20. Inlets 24 can be adjusted through slide 25, top portion of collector 27 and/or adjusting overflow tube 22 to control flow into the overflow system and to help control flow and settlement within hopper 18. Collector 26, overflow tube 22 and/or sleeve(s) 28 work to control and guide flow through the overflow system (possibly through forming one or more flow channels 30), helping to decrease or eliminate the introduction and mixing of air into flow. Collector 26 can help ensure head water enters inlet(s) 24 in a substantially radial direction, and then collects that head water and guides it to overflow tube 22 with little to no air mixed. Flow channel(s) 30 can be used to reduce the volume through which the head water flows through the overflow system 20 so that air does not mix in during flow through the overflow tube 22. Controlling flow into and through overflow system 20 allows for the decrease or elimination of a plume formed by turbidity and can increase the capacity of the overflow system.

While sleeve 28 is shown as a cylindrical tube and a plurality of cylindrical tubes, sleeve 28 can be in a different shape and/or configuration to assist in forming a flow channel with a desired cross-sectional area. Some embodiments, such as the embodiment of FIGS. 4a-4b do not include a sleeve.

While the term head water is used for the mixture entering and flowing through overflow system, this could be liquid and/or a combination of liquid and particles which were dredged and remain suspended.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. An adjustable overflow system for a hopper dredger, the overflow system comprising:
   an overflow tube;
   an inlet for taking in head water from the hopper;
   a collector to collect the flow of head water entering the inlet and guide the flow to the overflow tube, the collector with a substantially horizontal top portion which delineates a top of a flowpath for head water into the collector to ensure substantially radial flow into the collector, wherein at least one of the overflow tube and the inlet is adjustable for controlling flow into the overflow system, and
   a sleeve connecting to the collector and extending inside the overflow tube, wherein the sleeve, and the collector form a flow channel through the overflow tube,
   wherein the sleeve comprises tube connected to the collector and extending inside of the overflow tube to form the flow channel through the tube.

2. The overflow system of claim 1, wherein the overflow tube is adjustable in height.

3. The overflow system of claim 1, and further comprising one or more additional tubes connected to the collector to form one or more additional flow channels through the tubes.

4. The overflow system of claim 3, wherein the one or more tubes are flexible.

5. The overflow system of claim 1, and further comprising:
   a water level sensing device for sensing a level of head water in the hopper.

6. The overflow system of claim 1, wherein the inlet comprises a plurality of inlets.

7. The overflow system of claim 6, wherein the plurality of inlets are radial inlets.

8. The overflow system of claim 1, wherein the collector comprises a collector ring around the inner circumference of the overflow tube at the inlet.

9. The overflow system of claim 1, and further comprising:
   a slide for selectively controlling the size of the inlet.

10. The overflow system of claim 9, wherein the slide is controlled by a float.

11. The overflow system of claim 9, and further comprising:
   a pressure sensor for sensing pressure near the inlet;
   an actuator system for controlling the slide; and
   a processing unit for receiving pressure sensor readings and controlling the actuator system based on the pressure sensed.

12. The overflow system of claim 11, wherein the processing unit controls the actuator system to adjust the slide so that the pressure at the pressure sensor remains at or above a set value.

13. The overflow system of claim 12, wherein the set value is higher than local atmospheric pressure.

14. The overflow system of claim 1, wherein the top portion of the collector comprises a lid selectively moveable up and down with respect to the overflow tube for adjusting the inlet to control flow into the overflow system.

15. The overflow system of claim 14, and further comprising a plurality of ribs on the lid for guiding flow into the overflow system.

16. The overflow system of claim 15, wherein the lid is controlled by a float or a control system comprising:
- a pressure sensor for sensing pressure near the inlet;
- an actuator system for controlling the lid movement; and
- a processing unit for receiving pressure sensor readings and controlling the actuator system based on the pressure sensed.

17. A vessel comprising the overflow system of claim 1.

18. The vessel of claim 17, wherein the overflow tube and/or flow channel extends to a bottom of the vessel.

19. The vessel of claim 17, wherein the overflow tube and/or flow channel extends beyond a bottom of the vessel.

20. A method of flowing head water from a hopper to an exit of a vessel, the method comprising:
- adjusting an overflow system based on a pressure at an inlet of the overflow device;
- flowing the head water from the hopper through the inlet of the overflow system in a substantially radial direction by delineating a top of a flowpath into the collector with a substantially horizontal top portion of a collector;
- flowing the head water from the inlet to the collector within the overflow system; and
- flowing the head water from the collector to an overflow tube,
- wherein the overflow system comprises a sleeve connecting to the collector and extending inside the overflow tube, wherein the sleeve, and the collector form a flow channel through the overflow tube,
- wherein the sleeve comprises a tube connected to the collector and extending inside of the overflow tube to form the flow channel through the tube.

* * * * *